US 8,649,667 B2

(12) United States Patent
Kasuya

(10) Patent No.: US 8,649,667 B2
(45) Date of Patent: *Feb. 11, 2014

(54) RECORDING/REPRODUCING DEVICE

(75) Inventor: Junichi Kasuya, Kanagawa-ken (JP)

(73) Assignee: JVC Kenwood Corporation, Yokohama-shi, Kanagawa (JP)

(*) Notice: Subject to any disclaimer, the term of this patent is extended or adjusted under 35 U.S.C. 154(b) by 252 days.

This patent is subject to a terminal disclaimer.

(21) Appl. No.: 13/181,567

(22) Filed: Jul. 13, 2011

(65) Prior Publication Data

US 2011/0268421 A1 Nov. 3, 2011

Related U.S. Application Data

(63) Continuation of application No. 11/484,755, filed on Jul. 12, 2006, now Pat. No. 8,005,347.

(30) Foreign Application Priority Data

Jul. 13, 2005 (JP) ................ P2005-204962

(51) Int. Cl.
| | |
|---|---|
| H04N 5/89 | (2006.01) |
| H04N 5/783 | (2006.01) |
| H04N 5/917 | (2006.01) |
| H04N 9/80 | (2006.01) |
| G01P 15/00 | (2006.01) |
| G05B 11/46 | (2006.01) |
| G06F 1/00 | (2006.01) |
| G06F 15/16 | (2006.01) |
| G11B 15/04 | (2006.01) |
| G11B 19/02 | (2006.01) |
| G11B 21/02 | (2006.01) |
| G11B 27/36 | (2006.01) |

(52) U.S. Cl.
USPC ........... 386/334; 386/247; 386/248; 386/329; 386/350; 386/356; 73/489; 340/669; 340/670; 340/671; 340/689; 360/31; 360/60; 360/69; 360/75; 700/83; 709/219

(58) Field of Classification Search
USPC .......... 386/125, 68, 69, 70, E5.052, 248, 329, 386/356, E9.013; 340/669, 670, 671, 686.1, 340/689; 360/31, 60, 69, 75; 700/83; 709/219; 713/310; 714/24, E11.138, 714/E11.14; 73/489; 455/41.1
See application file for complete search history.

(56) References Cited

U.S. PATENT DOCUMENTS

| | | | | |
|---|---|---|---|---|
| 7,180,425 | B2 * | 2/2007 | Yuasa | 340/669 |
| 7,212,727 | B2 * | 5/2007 | Senoh | 386/68 |
| 7,366,950 | B2 * | 4/2008 | Itoh et al. | 714/24 |
| 2001/0023375 | A1 * | 9/2001 | Shen | 700/83 |
| 2002/0030911 | A1 * | 3/2002 | Mutoh | 360/31 |

* cited by examiner

*Primary Examiner* — Thai Tran
*Assistant Examiner* — Syed Hasan
(74) *Attorney, Agent, or Firm* — Nath, Goldberg & Meyer; Jerald L. Meyer; Stanley N. Protigal

(57) ABSTRACT

A drop sensor detects a drop of a device. When the drop of the device is detected, a sub CPU allows a counter to count a drop time. When the device drops for a predetermined time or more, the sub CPU controls a regulator so that the regulator forcibly disconnects an electric power to be supplied to a hard disc, and writes a drop occurrence flag into a nonvolatile memory. When the power supply is again turned on, a main CPU allows a display section to display information indicating that the power supply is disconnected due to the drop of the device.

3 Claims, 10 Drawing Sheets

| THE NUMBER OF POWER SUPPLY DISCONNECTING TIMES DUE TO DROP | TWO TIMES |
|---|---|

| DROP HISTORY | DROP DATE | DROP DISTANCE |
|---|---|---|
| | 2005. 5. 22 09:45 | 20 cm ~ 40 cm |
| | 2005. 7. 12 14:20 | LESS THAN 20 cm |
| | 2005. 7. 12 14:20 | 40 cm ~ 60 cm |

| DROP OCCURRENCE FLAG | 0 |
|---|---|

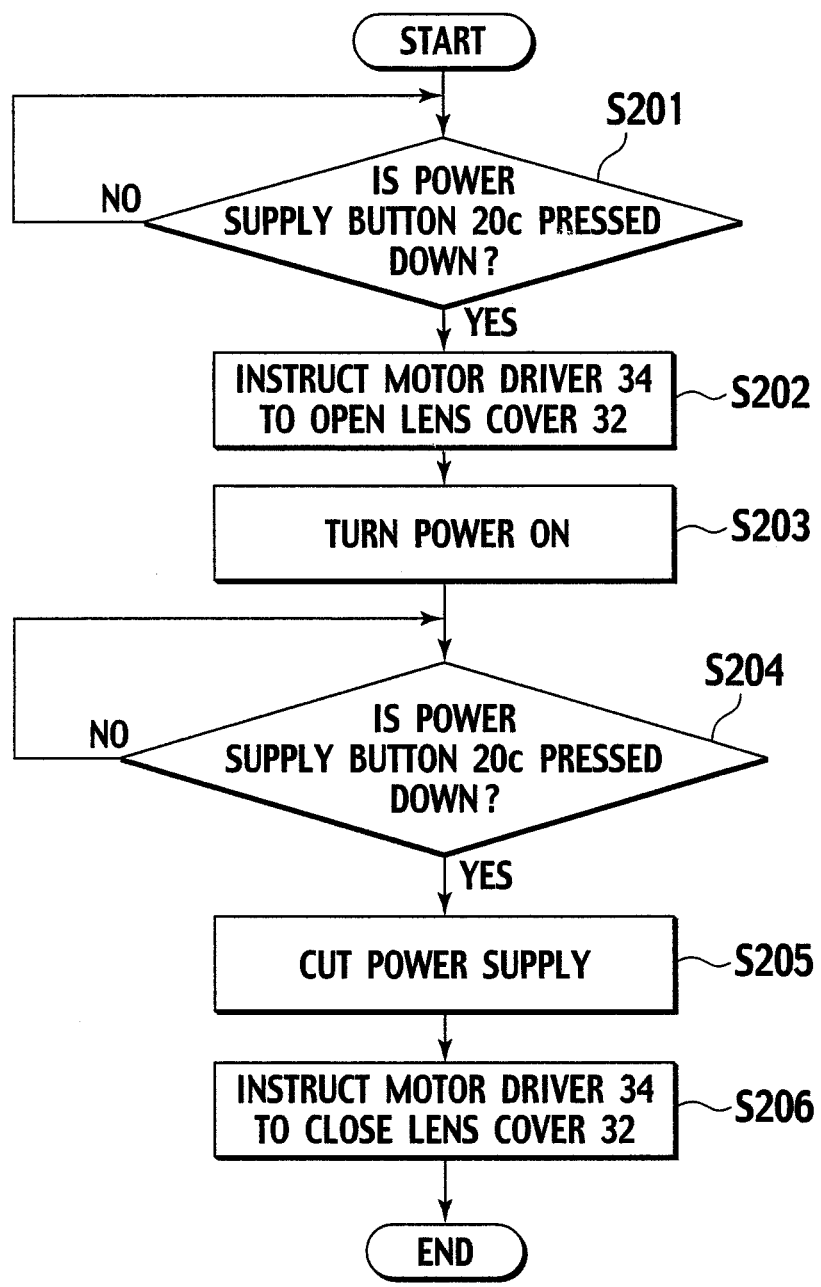

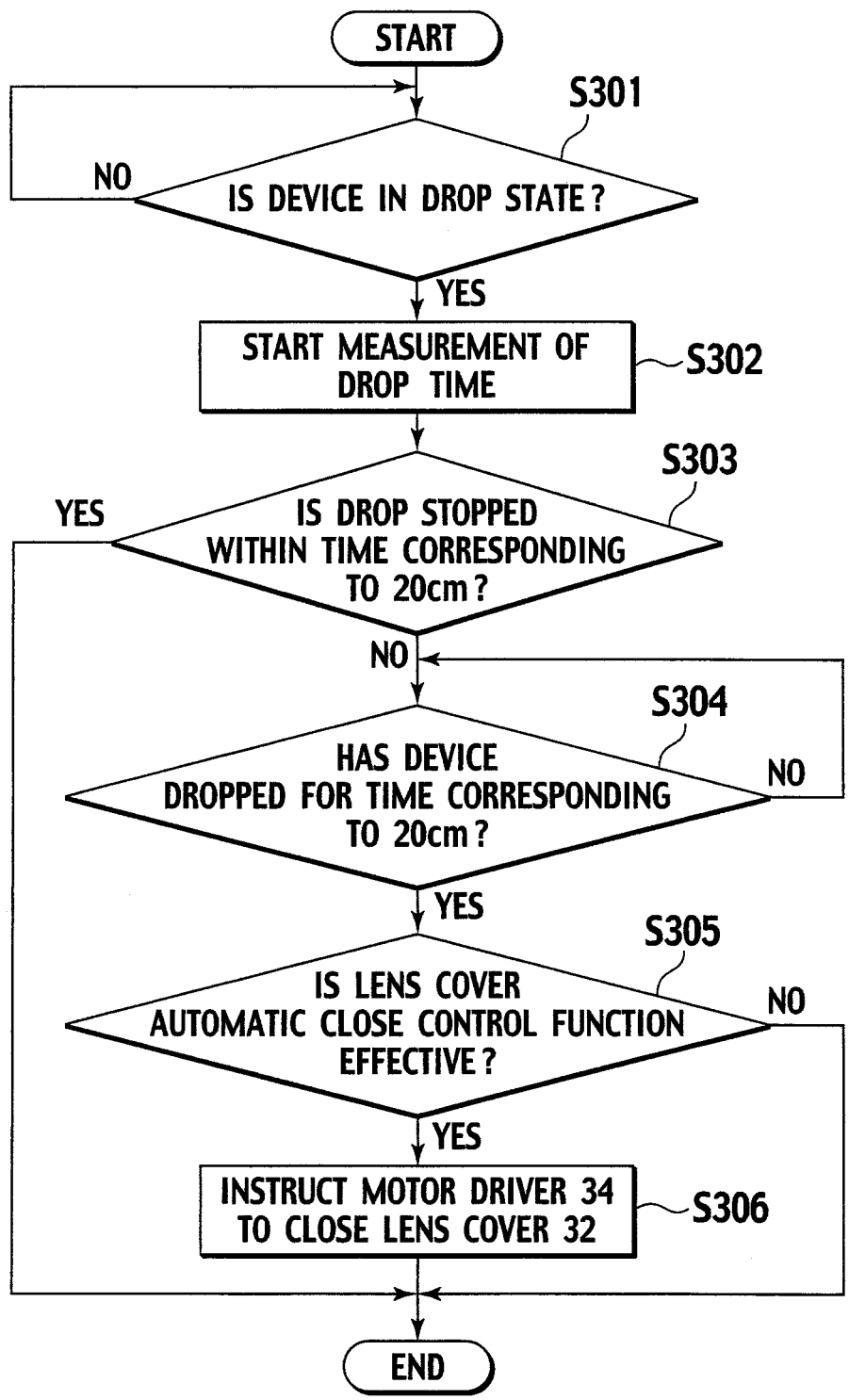

RECORDING/REPRODUCING DEVICE

This is a Continuation Application of U.S. patent application Ser. No. 11/484,755, filed on Jul. 12, 2006, which claims foreign priority benefits under 35 USC 119 of Japanese Patent Application No. P2005-204962, filed on Jul. 13, 2005, the content of each of which is hereby incorporated by reference in its entirety.

BACKGROUND OF THE INVENTION

1. Field of the Invention

The present invention relates to a portable recording/reproducing device that records or reproduces information about a video signal, an audio signal or the like. The invention particularly relates to the recording/reproducing device that are capable of avoiding or reducing various malfunctions occurred in the device when the device is dropped.

2. Description of the Related Art

Since hard disc drives, which are one kind of magnetic disc devices, have a comparatively susceptibility to external impacts, the use of the hard disc drives as recording media of portable electronic devices is avoided. In recent years, however, as hard discs are miniaturized and have larger capacity, the hard discs are designed so as to relive the external impacts. For this reason, the hard discs can be used as recording media of various recording/reproducing devices such as portable music players and camcorders.

Users possibly drop portable recording/reproducing devices by accident. When the hard disc drives is dropped, a magnetic head thereof bump against a magnetic disc surface so that recording data and moreover the hard disc itself are possibly damaged. Therefore, for example, Japanese Patent Application Laid-Open No. 2003-263853 discloses that when a drop sensor detects a drop of a device having a hard disc drive, a magnetic head is moved to a home position (shipping zone).

In the case where a recording/reproducing devices having a hard disc drive drops, even if a magnetic head is simply moved to a home position, a user is unsure about a check whether the device operates normally after the drop. Further, if the device becomes defective, information about troubleshooting is insufficient.

On the other hands, portable recording/reproducing devices are intentionally moved a lot or unintentionally moved a lot according to statuses of use. For this reason, it is desirable that the devices have a constitution such that a false detection of drop is avoided when the devices are not actually dropped.

Further, in the case where recording/reproducing devices drop and thus the recording of data are interrupted, it is preferable that the data which has been recorded until the interruption can be reproduced.

Furthermore, in the case where recording/reproducing devices are dropped, it is preferable that not only hard disc drives but also the other portions of the devices are prevented from being damaged. For example, even if hard disc drives (recording/reproducing sections) of camcorders are prevented from being damaged, when imaging lenses are damaged, the camcorders cannot fulfill their functions. Therefore, it is desired that the damage of the imaging lenses is prevented.

SUMMARY OF THE INVENTION

The present invention is devised in order to solve the above problems, and its object is to provide a recording/reproducing device having a hard disc drive in which when the device is dropped, damages of a magnetic head and a disc thereof can be prevented and simultaneously a user can understand a situation which has occurred in the device and can objectively understand the occurred situation as data. It is an object of the present invention to provide the recording/reproducing device that can avoid a false detection of drop when the device is not dropped.

It is another object of the present invention to provide the recording/reproducing device having a recording/reproducing section that can reproduce data which has been recorded until interruption even when the recording of the data is interrupted due to the drop of the device.

It is still another object of the present invention to provide a recording/reproducing device having an imaging lens that can prevent a damage of the imaging lens when the device is dropped.

In order to solve the above conventional technical problems, the present invention provides a recording/reproducing device that records or reproduces information, including: a hard disc drive (4) that records the information; a display section (8); a power supply (12, 19 that supplies an electric power to the hard disc drive so as to bring the recording/reproducing device into an operating state; a power supply button (20c) that gives instructions for turning on and disconnecting the power supply; a drop sensor (13) that detects a drop of the recording/reproducing device; a time counting section (14) that counts drop time when the drop sensor detects the drop of the recording/reproducing device based on a drop detected signal; a power supply control section (14) that, when the time counting section counts a predetermined time or more for which the recoding/reproducing device drops, controls the power supply so that the electric power to be supplied to the hard disc drive is forcibly disconnected and the recording/reproducing device is brought into an inoperable state; a memory (15); a writing section (14) that, when the power supply control section forcibly disconnects the electric power to be supplied to the hard disc drive, writes a flag representing that the electric power is forcibly disconnected into the memory; and a display control section (11) that, when the power supply button is pressed down by a user's operation to turn on the power supply and the flag is written into the memory, controls the display section so that information showing that the power supply is disconnected due to the drop of the recording/reproducing device is displayed thereon.

According to the present invention, in the recording/reproducing device having a hard disc drive, when the device is dropped, any damage of a magnetic head and a disc are prevented and simultaneously a user can understand what has happened in the device and can objectively understand the situation in the device as data. According to the present invention, a false detection of a drop can be avoided when the device was not dropped.

It is preferable that the time counting section counts a total drop time from a time at which the recording/reproducing device starts dropping to a time at which the drop stops, and the writing section writes data about the total drop time or a drop distance calculated based on the total drop time into the memory.

It is preferable that the writing section writes the number of the disconnection times of the power supply due to the drop of the recording/reproducing device into the memory.

A setting section (14), that selectively sets a first mode that makes the forcible disconnection of the electric power to be supplied to the hard disc drive by the power supply control section effective or a second mode that makes it ineffective, is preferable provided.

In order to solve the above conventional technical problems, the present invention provides recording/reproducing device that records or reproduces information; including: a recording/reproducing section (4) that records the information; a file creating section (5) that creates a file with a predetermined format where an actual data file containing video data is pared with a management information file as management information of the actual data file; a file recording management section (11) that is provided with a first folder for storing the file with the predetermined format and a second folder for storing another file as folders to be used for recording the information in the recording/reproducing section, and manages files to store the file with the predetermined format in the first folder when the file with the predetermined format is recorded in the recording/reproducing section: a power supply (12, 19) that supplies an electric power to the recording/reproducing section, the file creating section and the file recording management section so as to bring the recording/reproducing device into an operating state; a power supply button (20c) that gives instructions for turning on and disconnecting the power supply; a drop sensor (13) that detects a drop of the recording/reproducing device; a time counting section (14, 16) that, when the drop sensor detects the drop of the recording/reproducing device based on a drop detected signal, counts a drop time: and a power supply control section (14) that, when the time counting section counts a predetermined time or more for which the recording/reproducing device drops, controls the power supply so that the electric power to be supplied to the recording/reproducing section, the file creating section and the file recording management section is forcibly disconnected, and the recording/reproducing device is brought into an inoperable state. After the power supply is turned on by pressing the power supply button according to a user's operation so that the recording/reproducing device is brought into the operating state, when the management information file to be pared with the actual data file created at the time of forcibly disconnecting the electric power is not normally created, the file recording management section manages the recording of the file so that the actual data file is stored in the second folder.

According to the recording/reproducing device having the recording/reproducing section, even when the recording of data is interrupted by the drop of the device, the data recorded until the interruption can be reproduced.

It is preferable that the actual data file is an MOI file based on an SD-Video specifications, and the management information file is an MOD file based on the SD-Video specifications.

In order to solve the conventional technical problems, the present invention provides a recording/reproducing device that records or reproduces a video signal, including: an imaging section (3) that images an object; an imaging lens (31) that condenses light onto the imaging section; a lens cover (32) that covers the imaging lens; a driving section (33, 34) that drives the lens cover into an open state where the imaging lens is not covered or a close state where the imaging lens is covered; a recording/reproducing section (4) that records or reproduces a video signal obtained by the imaging by the imaging section; a drop sensor (13) that detects a drop of the recording/reproducing device; a time counting section (14, 16), when the drop sensor detects the drop of the recording/reproducing device based on a drop detected signal, counts a drop time; and a control section (14) that, when the time counting section counts a predetermined time or more for which the recording/reproducing device drops, controls the driving section so that the lens cover in the open state is brought into the close state.

According to the present invention, in the recording/reproducing device having an imaging lens, when the device is dropped, a damage of the imaging lens can be prevented.

It is preferable that the device further includes a power supply (12, 19) that supplies an electric power to at least the imaging section and the recording/reproducing section so as to bring the recording/reproducing device into an operating state; and a power supply button (20c) that gives instructions for turning on and disconnecting the power supply. It is also preferable that the control section controls the driving section so that the lens cover in the close state is brought into the open state in cooperation with the instruction for turning on the power supply by pressing down the power supply button according to a user's operation and the bringing of the recording/reproducing device into the operating state.

The nature, principle and utility of the invention will become more apparent from the following detailed description when read in conjunction with the accompanying drawings.

BRIEF DESCRIPTION OP THE DRAWINGS

In the accompanying drawings;

FIG. 10 is a flowchart for explaining an operation of the second embodiment; and FIG. 11 is a flowchart for explaining an operation of the second embodiment.

DETAILED DESCRIPTION OF THE PREFERRED EMBODIMENTS

A recording/reproducing device of the present invention is explained below with reference to accompanying drawings.

First Embodiment

A first embodiment of the present invention is a recording/reproducing device having a hard disc drive, and an example of the recording/reproducing device is a camcorder. The present invention is not limited to camcorders and thus can be applied to all recording/reproducing devices such as recording/reproducing devices dedicated to music having hard discs (or another recording/reproducing sections). In the first embodiment, a constitution is such that when the device is dropped, damages of a magnetic head and a disc thereof are prevented and simultaneously a user can understand a situation which has occurred in the device and can objectively understand the occurred situation as data. At the same time, the recording/reproducing device is constituted so that a false detection of drop can be avoided when the device is not actually dropped. Further, the device is constituted so that when recoding of data is interrupted due to a drop of the recording/reproducing device, the data that has been recorded until the interruption can be reproduced.

Figure 1:
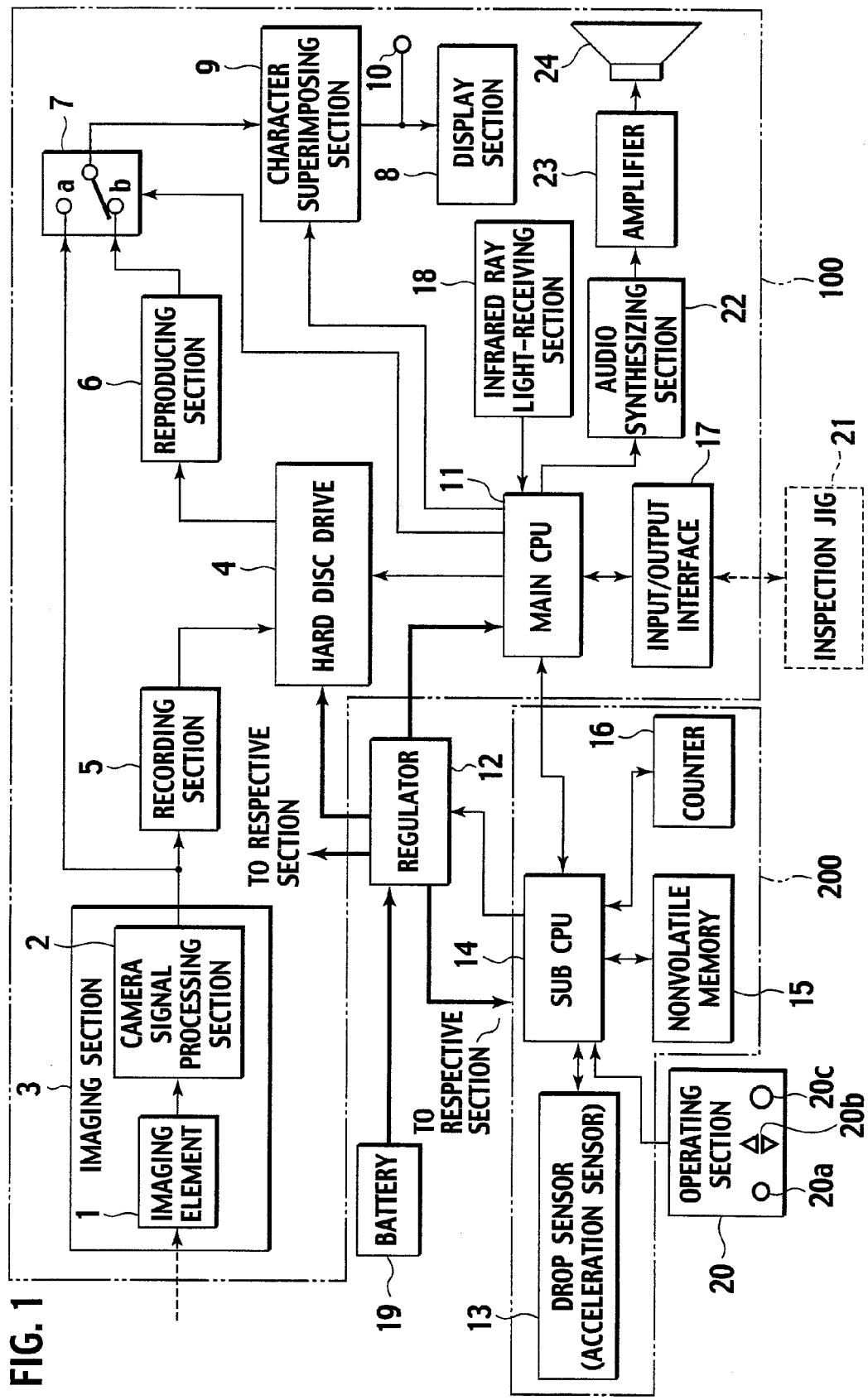
FIG. 1 is a block diagram illustrating a first embodiment of the present invention.

FIG. 1 is a block diagram illustrating the recording/reproducing device according to the first embodiment of the present invention.

In FIG. 1, a light signal from an object is input into an imaging element 1 of an imaging section 3 via an imaging lens, not shown. The imaging element 1 is, for example, a CCD (Charge Coupled Device). The imaging element 1 converts the input light signal into an electric signal so as to supply it to a camera signal processing section 2 of the imaging section 3. The camera signal processing section 2 gives a predetermined signal process to the input electric signal so as to output it as a video signal. The video signal output from the camera signal processing section 2 is input into a recording section 5 and a terminal a of a switching section 7.

The recording section 5 converts the input video signal into a digital signal so as to compress data using the MPEG2 compressing system, for example. A processing system of an audio signal not explained, but the recording section 5 compresses also an audio signal input from a microphone, not shown, and creates actual data composed of video data and audio data. The recording section 5 generates management information which is used for reproducing the compressed data of the video signal based on photographing date information and time information about file data from a main CPU 11 or a sub CPU 14. In the first embodiment, the recording section 5 creates a file based on the SD-Video specifications according to the actual data and the management information. The SD-Video specifications are composed of an MOD file as an MPEG file of video data and audio data and an MOI file as a management information file.

The recording section 5 is a file creating section that creates a file having a predetermined format where the actual data file including the video data is pared with the management information file as management information of the actual data file. In the first embodiment, the SD-Video specifications are used as an example, but the invention is not limited to this.

Figure 2:
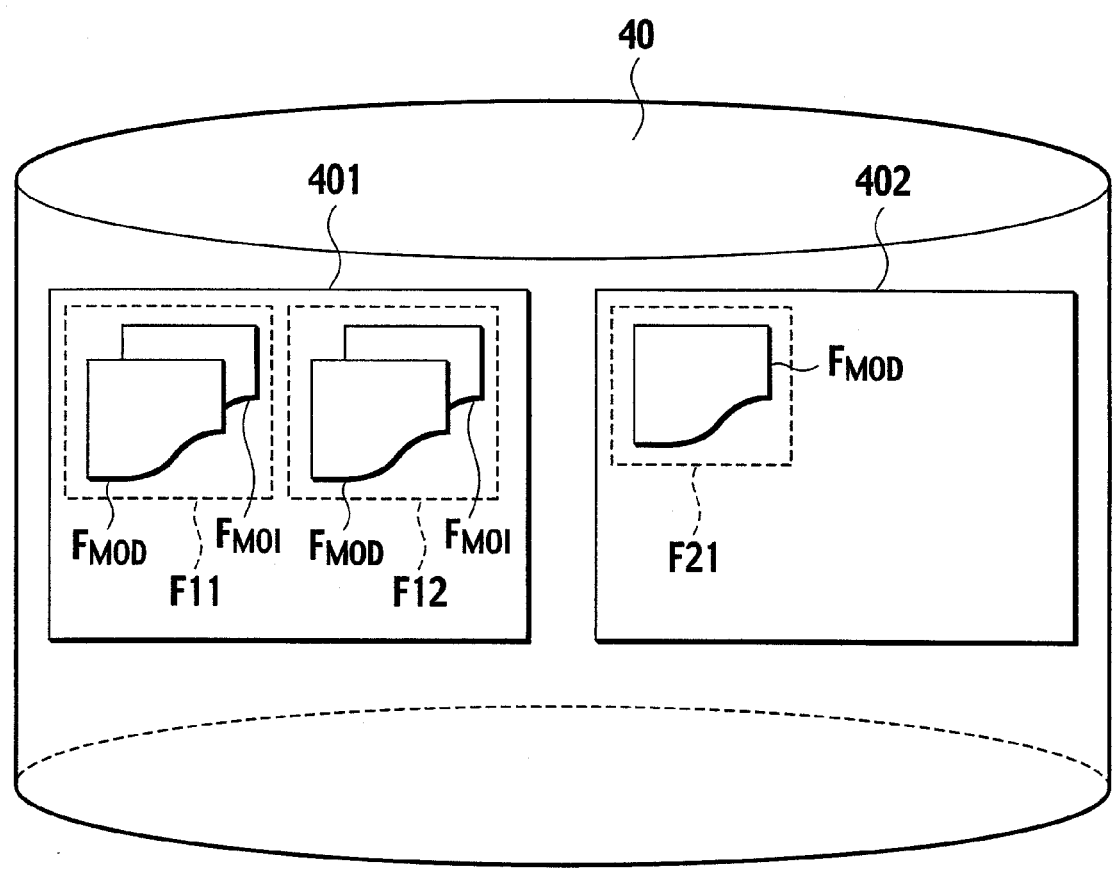
FIG. 2 is a conceptual diagram illustrating file recording management according to the first embodiment.

FIG. 2 is a conceptual diagram illustrating the recording management of the file to be stored in a hard disc 40 of a hard disc drive 4. The file recording is managed by the main CPU 11. That is to say, the main CPU 11 is a file recording management section. A folder 401 for recording the file based on the SD-Video specifications and another folder 402 are provided into the hard disc 40. The folder 402 is explained later. Starting through end of one-time photographing in a camcorder is determined as a unit. The recording section 5 creates one file based on the SD-Video specifications, and the file is recorded into the folder 401 in the hard disc 40 by control of the main CPU 11. FIG. 2 illustrates a state that two files F11 and F12 are recorded. As shown in FIG. 2, the files F11 and F12 have paired MOD file $F_{MOD}$ and MOI file $F_{MOI}$. The MOI file $F_{MOI}$ is used for accurately executing special reproduction such as fast-speed reproduction and reverse reproduction when the MOD file $F_{MOD}$, for example, is reproduced.

With reference to FIG. 1, when the file recorded in the hard disc drive 4 is reproduced by control of the main CPU 11, the data in the reproduced file are input into a reproducing section 6. The reproducing section 6 decodes the compressed data so as to execute a reproducing process on the data such as D/A conversion and supply the data to a terminal b of the switching section 7. The switching section 7 selects any one of the terminals a and b according to the control of the main CPU 11, and outputs any one of a video signal generated by a current photographing from the imaging section 3 and a video signal reproduced from the hard disc drive 4. The video signal output by the switching section 7 is input into a character superimposing section 9 so that characters such as letters and symbols are superimposed on the video signal by the control of the main CPU 11 as the need arises. The video signal is displayed on a display section 8 such as a liquid crystal panel. An output from the character superimposing section 9 is supplied also to a video output terminal 10, so that the video signal can be output to the outside.

The main CPU 11 is used for entirely controlling the recording/reproducing device. The main CPU 11 is connected to an input/output interface 17, an infrared ray light-receiving section 18 and an audio synthesizing section 22. The functions of the input/output interface 17, the infrared ray light-receiving section 18 and the audio synthesizing section 22 are explained later. The portion from the imaging section 3 to the infrared ray light-receiving section 18 which is surrounded by a chain double-dashed line is a main section 100 which operates when the power supply of the recording/reproducing device is turned on. A regulator 12 is connected to a battery 19, and the regulator 12 converts DC electricity from the battery 19 into a voltage so as to supply the voltage to the respective sections (electrical energy). The regulator 12 and the battery 19 are the power supply of the device. The electric power (power supply line) to be supplied from the regulator 12 to the respective sections is shown by a thick solid line. The electric power is supplied only to the hard disc drive 4 and the main CPU 11 in the drawing, but the electric power is supplied to the respective sections requiring the electric power such as the imaging section 3, the recording section 5, the reproducing section 6, the switching section 7, the character superimposing section 9 and the display section 8.

The recording/reproducing device in FIG. 1 includes a drop sensor 13, the sub CPU 14, a nonvolatile memory 15, a counter 16 and an operating section 20. The portion, which is composed of the drop sensor 13, the sub CPU 14, the nonvolatile memory 15 and the counter 16 and is surrounded by a chain double-dashed line, is a sub section 200 to which the electric power is supplied from the regulator 12 also when the power supply of the recording/reproducing device is turned off. The drop sensor 13 is, for example, an acceleration sensor which measures a level of an acceleration in three axial directions, namely, X, Y and Z axial directions, and detects whether the device is dropping. Concretely, since the acceleration in the X, Y and Z axial directions becomes approximately zero in a state that the device is freely dropping, the drop sensor can detect whether the device is dropping based on the acceleration in the three axial directions.

The detected output from the drop sensor 13 is input into the sub CPU 14. The sub CPU 14 is connected to the nonvolatile memory 15, the counter 16 and the operating section 20. The functions of the nonvolatile memory 15 and the counter 16 are explained later. The counter 16 is separated from the sub CPU 14 in this example, but the sub CPU 14 may contain the counter 16. The operating section 20 includes, for example, a setting button 20a, a cursor button 20b and a power supply button 20c. When the power of the recording/reproducing device is instructed to be turned on by pressing down the power supply button 20c, the sub CPU 14 controls the regulator 12 so that the electric power is supplied to the respective sections of the main section 100. As a result, the recording/reproducing device is brought into an operating state. Even if the power supply of the recording/reproducing device is disconnected, the electric power is supplied from the regulator 12 to the sub section 200 as long as the battery 19 is not removed. As a result, the sub sections 200 is in the operating state.

Figure 3:
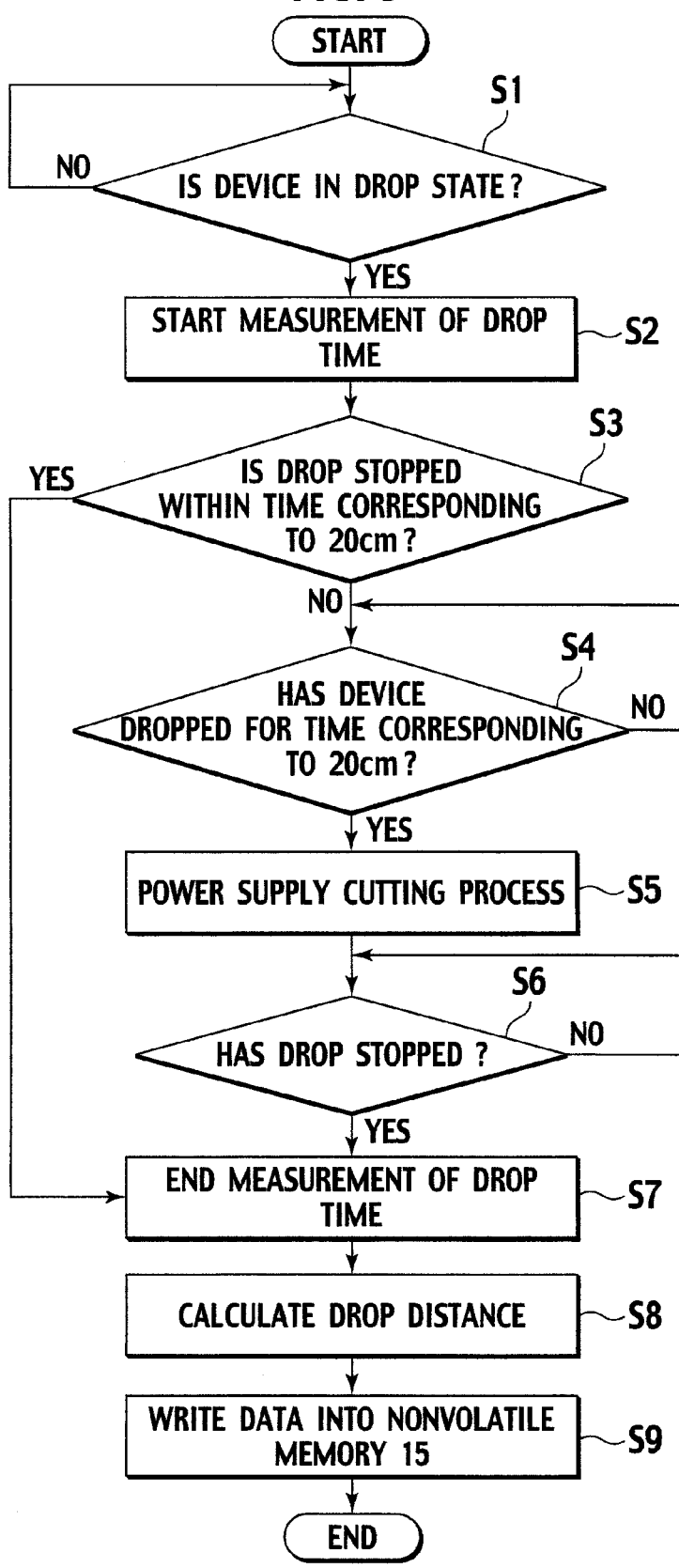
FIG. 3 is a flowchart illustrating a drop detecting process according to the first embodiment.

A device drop detecting process is explained below. FIG. 3 is a flowchart illustrating the drop detecting process according to the first embodiment. The drop detecting process shown in FIG. 3 is executed by the sub CPU 14 when the main section 100 is in the operating state. In FIG. 3, the sub CPU 14 determines at step S1 whether the device is in the drop state based on a detected output (drop detected signal) from the drop sensor 13. When the detected output from the drop sensor 13 is not more than a predetermined threshold value which is approximately zero, the sub CPU 14 determines that the device is in the drop state. When the determination is made that the device is not in the drop state (No), the sequence returns to step S1. When the determination is made that the device is in the drop state (Yes), the sub CPU 14 allows the counter 16 to count the time from the starting of the drop state at step S2 so that the measurement of the drop time is started. The sub CPU 14 and the counter 16 are a time counting section that counts the drop time.

Thereafter, the sub CPU 14 determines at step S3 whether the drop of device stopped within the time corresponding to a predetermined distance, for example, 20 cm based on the value counted by the counter 16. When determination is made at step S3 that the drop of the device stopped within the time corresponding to 20 cm (Yes), the sequence goes to step S7. When the determination is made that the drop of the device did not stop within the time corresponding to 20 cm (No), the sequence goes to step S4.

The sub CPU 14 determines at step S4 whether the device has dropped for the time corresponding to 20 cm based on the value counted by the counter 16. When the determination is made at step S4 that the device has not yet dropped for the time corresponding to 20 cm (No), the sequence returns to step S4. When the determination is made that the device has dropped for the time corresponding to 20 cm (Yes) the sub CPU 14 executes a power supply disconnecting process at step S5. The power supply disconnecting process at step S5 is explained specifically later. The power supply is disconnected when the device has dropped for the time corresponding to 20 cm because the drop guarantee of the hard disc drive 4 as the specification of the device is up to 30 cm. The drop time at which the power supply should be cut (drop distance) may be set suitably according to the height of the drop guarantee.

The sub CPU 14 determines whether the drop of the device has stopped at step S6. When the determination is made at step S6 that the drop has not yet stopped (No), the sequence returns to step S6. When the determination is made at step S6 that the drop has already stopped (Yes), the sub CPU 14 stops the counting of the time by means of the counter 16 at step S7, and ends the measurement of the drop time. The drop time means total drop time from the time of the detection of the device drop to the time of stopping of the drop. The sub CPU 14 calculates the drop distance of the device at step S8. The drop distance L can be calculated according to the following equation (1) where a gravitational acceleration is designated by g and the drop time is designated by t:

$$L = gt^2/2 \quad (1)$$

The sub CPU 14 writes data about the drop into the nonvolatile memory 15 at step S9 and ends the process. The data about the drop is, for example, the number of times of detecting the drop of the device and disconnecting the power supply, a drop history including the drop date and the drop distance, and a drop occurrence flag. The drop occurrence flag is explained later. The drop distance may be the drop distance calculated at step S8 in FIG. 3, but may be also drop distances obtained by dividing the drop distance into plural stages. For example, the drop distance is divided into less than 20 cm at which the power supply is not disconnected, from not less than 20 cm to less than 40 cm, from not less than 40 cm to less than 60 cm, from not less than 60 cm to less than 80 cm, from not less than 80 cm to less than 100 cm, and not less than 100 cm.

Figures 4, 5:
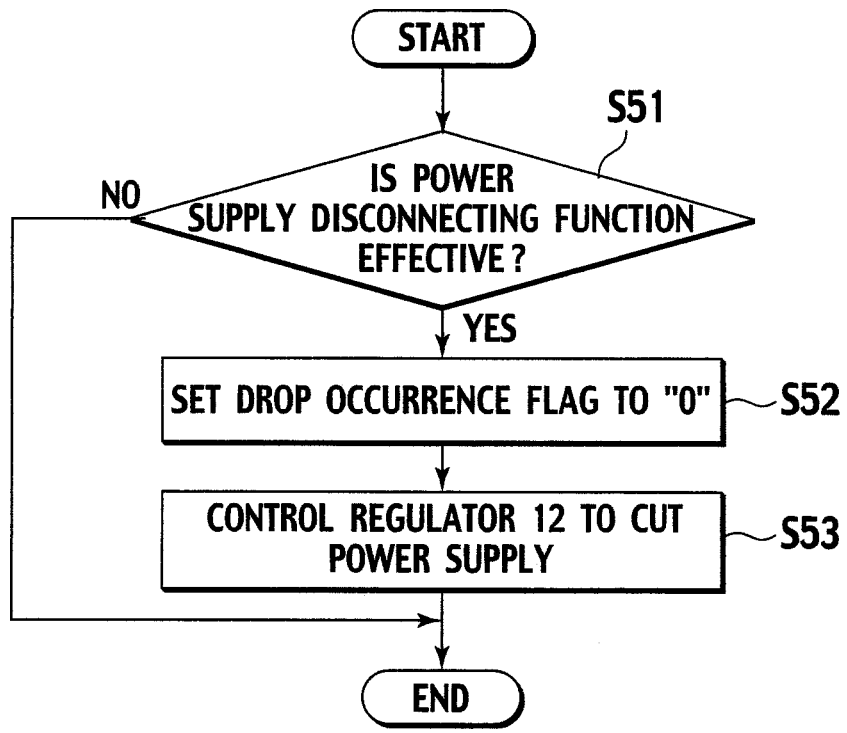
FIG. 4 is a diagram illustrating an example of data to be recorded in a nonvolatile memory according to the first embodiment.
FIG. 5 is a flowchart illustrating a power supply disconnecting process according to the first embodiment.

FIG. 4 is a diagram illustrating an example of the data to be recorded in the nonvolatile memory in the first embodiment. FIG. 4 shows one example of the data about the drop written into the nonvolatile memory 15 as a list format for easy understanding. The drop history may include a predetermined number (for example, three) of data set from the latest one. Less than 20 cm may be eliminated from the drop history, and thus the history to be stored may be set suitably. The data about the drop includes the number of the power supply disconnecting times, the drop date, the drop distance and the drop occurrence flag, but the data may include at least one of them or includes another additional data. The drop distance is stored because when the device breaks down, information about an occurred situation, more specifically, whether the device drops, or if the device drops, how long the device drops is desired to be acquired. The drop time is stored instead of the drop distance so that the drop distance may be calculated based on the drop time at the time of troubleshooting or repairs.

The power supply disconnecting process at step S5 in FIG. 3 is concretely explained below. FIG. 5 is a flowchart illustrating the power supply disconnecting process in the first embodiment. In FIG. 5, the sub CPU 14 determines whether the power supply disconnecting function for disconnecting the power supply of the device is effective when the device drops at step S51. The power supply disconnecting function is set as effective or ineffective in the following manner as one example. For example, when the setting button 20a of the operating section 20 is pressed down, the sub CPU 14 instructs the main CPU 11 to display a menu for the main CPU 11 switching the power supply disconnecting function between effective (first mode) and ineffective (second mode) on the display section 6. When effective or ineffective is selected by the cursor button 20b, the sub CPU 14 sets the power supply disconnecting function as effective or ineffective. The sub CPU 14 is a setting section that selectively sets the first mode or the second mode.

In substitution for switching of the power supply disconnecting function between effective and ineffective on the menu, for example, a switch is provided between the drop sensor 13 and the sub CPU 14, and the switch may switch whether or not a drop detected signal from the drop sensor 13 is input into the sub CPU 14. Means for setting the power supply disconnecting function to effective or ineffective is not limited to the above.

The power supply disconnecting function can be switched between effective and ineffective and step S51 is provided to the power supply disconnecting process for the following reason.

For example, in the case where photographing is carried out while a user gets on a vehicle such as a roller coaster in an amusement part, the drop sensor 13 as the acceleration sensor outputs a drop detected signal at the time of descending of the roller coaster although the device does not drop from a hand of the photographer (user). In this case, the power supply of the device is disconnected, and photographing thereafter cannot be carried out. Therefore, a function for making the power supply disconnecting function ineffective due to the drop is provided, so that the power supply of the device is disconnected only when the power supply disconnecting function is effective. As a result, even if the drop sensor 13 outputs a drop detected signal and the sub CPU 14 detects the drop of the device (the determination is made at step S1 in FIG. 3 that the device is in the drop state), the power supply of the device is not disconnected, and thus the photographing during the descending of the roller coaster or the like is enabled. According to this embodiment, in a situation where the device does not actually drop from the hand of the photographer in the case where the device is intentionally or unintentionally moved a lot, a false detection of the drop can be avoided.

In FIG. 5, when the power supply disconnecting function is effective at step S51 (Yes), the sequence goes to step S52, and when ineffective (No)), the power supply is not disconnected and the process is ended. The sub CPU 14 rewrites the drop occurrence flag, which is stored in the nonvolatile memory 15 and represents whether the device has dropped, from "1" representing that the drop has not yet occurred into "0" the drop has occurred. The sub CPU 14 is a writing section that writes data about a drop such as the drop occurrence flag into the nonvolatile memory 15.

The sub CPU 14 controls the regulator 12 so that the power source of the main section 100 is forcibly disconnected at step S53 and the process ends. The regulator 12 stops the supply of the electric power to the main section 100 according to the cutting instruction of the power supply by means of the instruction for disconnecting the power supply from the sub CPU 14, and brings the main section 100 into an inoperable state. The sub CPU 14 is a power supply control section that controls switching whether the electric power is supplied to the main section 100 using the regulator 12.

When the power supply is disconnected, the magnetic head of the hard disc drive 4 is returned to a home position (shipping zone) as a refuge area other than the recording/reproducing area of the hard disc 40. In this embodiment, the power supply is disconnected by the drop detecting process in FIG. 3 and the power supply disconnecting process in FIG. 5 before the hard disc drive 4 of the device receives any impact due to the drop. This can prevent the magnetic head from bumping against the recording/reproducing area, and the hard disc 40 or the magnetic head from being damaged. Further, this can greatly reduce the possibility of damaging the hard disc 40 or the magnetic head.

Figure 6:
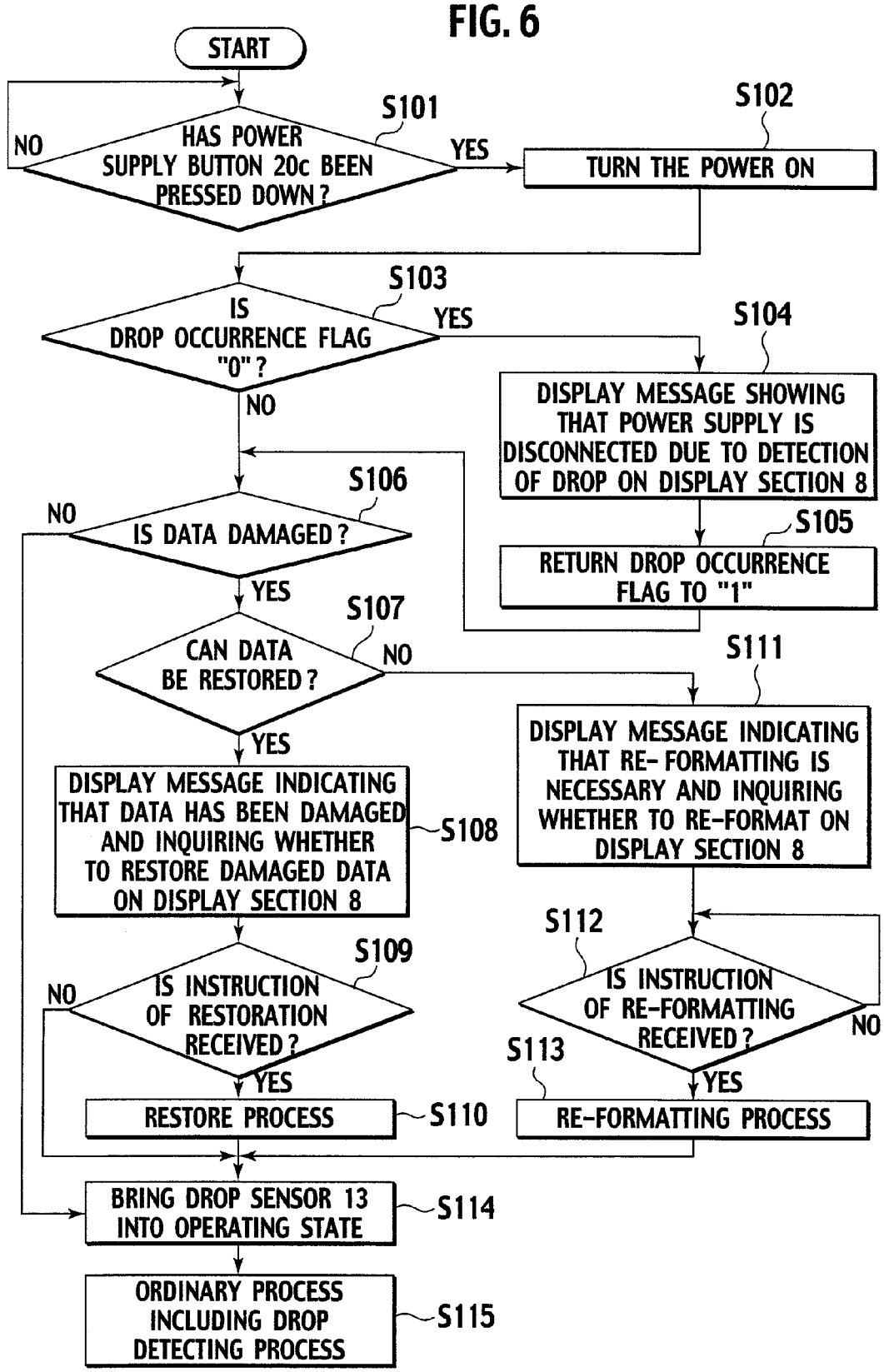
FIG. 6 is a flowchart illustrating from a power supply activating process to an ordinary process according to the first embodiment.

The steps from the step at which the user presses down the power supply button 20c so as to turn on the power supply of the device to the step of going to the ordinary process are explained below. FIG. 6 is a flowchart illustrating the steps from the power activation to the ordinary process in the first embodiment. The steps shown in FIG. 6 are executed both in the case where the sub CPU 14 in FIG. 5 detects the drop of the device and disconnects the power supply of the device and in the case where the user presses down the power supply button 20c and disconnects the power supply of the device. The steps shown in FIG. 6 are executed by allowing the main CPU 11 and the sub CPU 14 to cooperate.

In FIG. 6, the sub CPU 14 determines whether the power supply button 20c has been pressed down at step S101. When the determination is made that the power supply button 20c has been pressed down (Yes), the sub CPU 14 controls the regulator 12 so that the power supply of the device is turned on at step S102. When the determination is made that the power supply button 20c has not been pressed down (Na), the sequence returns to step S101. When the power supply is turned on, the main CPU 11 reads the drop occurrence flag stored in the nonvolatile memory 15 via the sub CPU 14 and determines whether the drop occurrence flag indicates "0" at step S103. The main CPU 11 may read the drop occurrence flag directly from the nonvolatile memory 15.

Figure 7A:
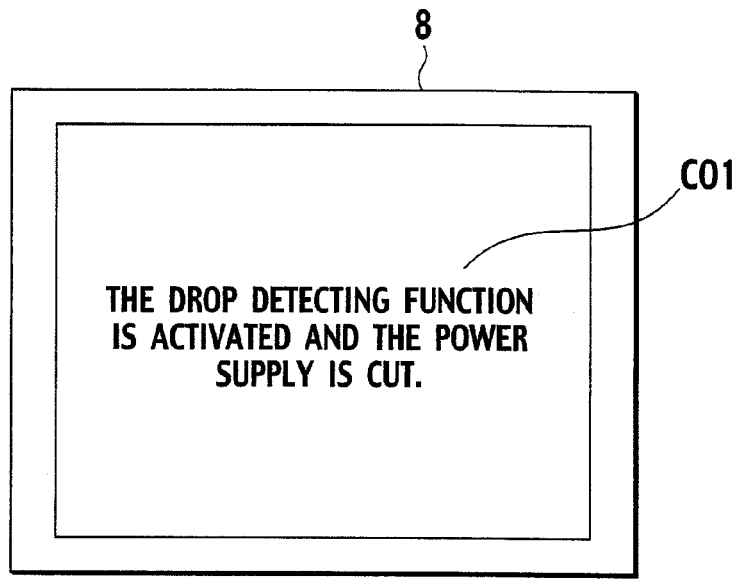
FIGS. 7A to 7C are diagrams illustrating examples of messages to be displayed on a display section according to the first embodiment.

When the drop occurrence flag indicates "0" (Yes), the main CPU 11 controls the character superimposing section 9 so that a message showing that the power supply is disconnected due to the detection of the drop at step S104 on the display section 8. As a result, as shown in FIG. 7A, a sentence C01 "the drop detecting function is activated and the power supply is cut" is displayed as one example on the display section 8. The character superimposing section 9 stores a plurality of characters such as letters and symbols in a built-in table, and superimposes information according to the instruction from the main CPU 11 on a video signal output from the switching section 7. The main CPU 11 is a display control section that controls the display section 8 so that various information is displayed thereon.

When the message shown in FIG. 7A is displayed on the display section 8, the user can acknowledge the cause of the disconnecting of the power supply. Since the user can understand the situation of the device that the device has been dropped and the power supply has been cut, the user can use the device thereafter with ease.

The main CPU 11 returns the drop occurrence flag stored in the nonvolatile memory 15 to "1" via the sub CPU 14 at step S105. The process for returning the drop occurrence flag to "1" does not have to be executed just after the display in FIG. 7A and thus may be executed before going to the ordinary process.

When the drop occurrence flag does not indicate "0" at step S103 (No), the main CPU 11 determines whether the data recorded in the hard disc 40 are damaged at step S106. When the determination is made that the data are damaged (Yes), a determination is made at step S107 whether the data can be restored. When the data are not damaged at step S106, the sequence goes to step S114. The damage of the data includes a case where the data are created but they are damaged and a case where the data which should be originally created cannot be created.

In the first embodiment, the file based on the SD-Video specifications is recorded in the hard disc 40. In the case where the drop of the device is detected and the power supply to the main section 100 is forcibly disconnected, when the MOD file is recorded in the hard disc 40 but the MOI file which are paired with the MOD file is not created and is not recorded in the hard disc 40, the file cannot be reproduced as a file based on the SD-Video specifications. However, the MOD file can be reproduced as a MPEG file. In this sense, the determination whether the data can be restored at step S107 means the determination whether the file can be saved as a MPEG file in the hard disc 40 although it cannot be saved as a file based on the SD-Video specifications in the hard disc 40.

Figure 7B:
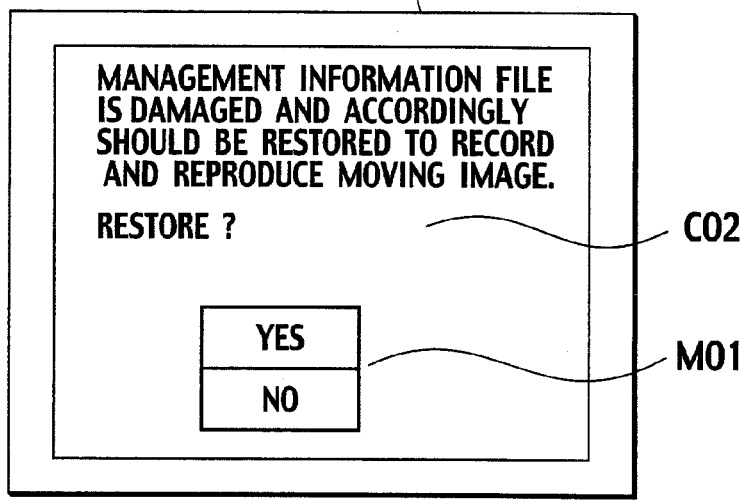

When the determination is made that the data can be restored at step S107 (Yes), the main CPU 11 controls the character superimposing section 9 to display a message indicating that the data has been damaged and inquiring whether the damaged data is desirably be restored, on the display section 8 at step S108. As a result, as shown in FIG. 7B, the sentence C02 "The management information file is damaged and accordingly should be restored to record and reproduce a moving image. Restore?" and a selection mark M01 for selecting whether to restore the file are displayed as one example on the display section 8. For example, any one of "Yes" for selecting the restoration and "No" for selecting no-restoration is selected by the cursor button 20b and is determined by the setting button 20a.

The main CPU 11 determines whether the instruction of restoration is received at step S109. When the instruction of restoration is received (namely, "Yes" is selected) (Yes), the restoring process is executed at step S110. When the instruction of restoration is not received (namely, "No" is selected) (No), the sequence goes to step S114. The restoring process at step S109 includes a process of recording the MOD file $F_{MOD}$ without the MOI file $F_{MOI}$ not in the folder 401 for recording files based on the SD-Video specifications but in the folder 402 for storing the MPEG files like the file F21 of FIG. 2. Only the MOD file $F_{MOD}$ recorded in the folder 402 cannot be reproduced as a file based on the SD-Video specifications but can be reproduced as a MPEG file.

Figure 7C:
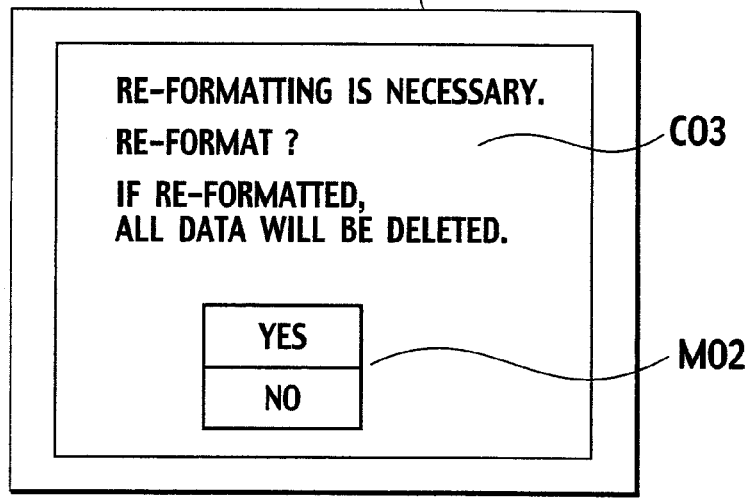

On the other hand, when the determination is made that the data cannot be restored at step S107 (No), the main CPU 11 should re-format the hard disc 40 at step S111, and controls the character superimposing section 9 to display on the display section 8 a message inquiring whether to re-format the hard disc 40. As a result, as shown in FIG. 7C, the sentence C03 "Re-formatting is necessary. Re-format? If re-formatted, all the data will be deleted." and a selection mark M02 for selecting whether to re-format the hard disc are displayed as one example on the display section 8. The main CPU 11 determines whether the instruction of re-formatting is received at step S112. When the instruction of re-formatting is received (namely, "Yes" is selected) (Yes), the re-formatting process is executed at step S113. When the instruction of re-formatting is not received (namely, "No" is selected) (No), the sequence returns to step S112.

Since the device is not in a usable state without re-formatting, when the re-formatting is not instructed, the sequence returns to step S112. However, data that has been recorded cannot be occasionally deleted. The selection "No" is, therefore, provided to the selection mark M02. In FIG. 6, when the instruction of re-formatting is not received at step S112, the power supply of the device may be disconnected.

The steps S106 to S113 in FIG. 6 are executed not only in the case where the power supply is disconnected due to the drop of the device but also in the case where the user presses down the power supply button 20c in the normal use state to cut the power supply of the device. This is because even in the case where any data error occurs on the data recorded, in the hard disc 40 due to reasons other than the drop of the device, it is necessary to restore data and re-format the hard disc 40 similarly. In the case where any failure occurs in the device, the messages shown in FIGS. 7B and 7C are displayed on the display section 8. As a result, the user can easily understand the recording condition of data (file) and the restoring method for the data, and accordingly the convenience at the time of using the device is improved.

When the restoring process at step S110 or the re-formatting process at step S113 is completed, the sequence goes to step S114. The main CPU 11 brings the drop sensor 13 into the operating state via the sub CPU 14 at step S114. In the case where the power supply to the main section 100 is disconnected so that the main section 100 is in the inoperable state and only the sub section 200 is in the operating state, the drop sensor 13 is brought into a sleep state in order to reduce the power consumption in the sub section 200. The drop sensor 13 is, therefore, activated so as to be in the operating state at step S114. The main CPU 11 and the sub CPU 14 execute the ordinary process including the drop detecting process of FIG. 2 at step S115. The ordinary process includes the drop detecting process and also the process of performing normal operations such as recording, reproduction and the like to be carried out by the recording/reproducing device of FIG. 1.

With reference to FIG. 1, how to read the data saved in the nonvolatile memory 15 at the time of troubleshooting and inspection of the device will be explained. In FIG. 1, the main CPU 11 is connected to the input/output interface 17. The inspection jig 21 is connected to the input/output interface 17 at the time of troubleshooting and inspection of the device, and a reading instruction signal for the data stored in the nonvolatile memory 15 is supplied from the inspection jig 21 to the main CPU 11. The main CPU 11 reads the data relating to the drop stared in the nonvolatile memory 15 via the sub CPU 14, and supplies the data to the inspection jig 21 via the input/output interface 17. Similarly to the drop occurrence flag, the main CPU 11 may directly read the number of the times of the power supply disconnection due to the drop and the data about drop history stored in the nonvolatile memory 15. When the data about the drop stored in the nonvolatile memory 15 are read, the situation in the device can be understood objectively as data. Accordingly, it becomes possible to carry out a troubleshooting and also pursue any cause resulting in the failure.

The main CPU 11 is connected also to the infrared ray light-receiving section 18. In the case where a remote control transmitter for inspection is used for the troubleshooting and the inspection, the reading instruction signal for the data stored in the nonvolatile memory 15 may be supplied to the main CPU 11 via the infrared ray light-receiving section 18 by operating the remote control transmitter. In this case, the data about the drop stored in the nonvolatile memory 15 may be displayed on the display section 8.

In the first embodiment, the disconnection of the power supply due to the drop of the device, the destruction of the management information file, and the necessity of the re-formatting are displayed as visual information on the display section 8. However, messages similar to the messages shown in FIGS. 7A to 7C may be output as audio signals (audio information). In another method, a warning sound for impressing the user on that the visual information is displayed on the display section 8 may be generated. In these cases, the main CPU 11 controls the audio synthesizing section 22 to generate an audio signal and supply the generated audio signal to a speaker 24 via an amplifier 23. The audio synthesizing section 22 is provided independent upon the main CPU 11, but the main CPU 11 may contain an audio synthesizing program.

Second Embodiment

Figure 8:
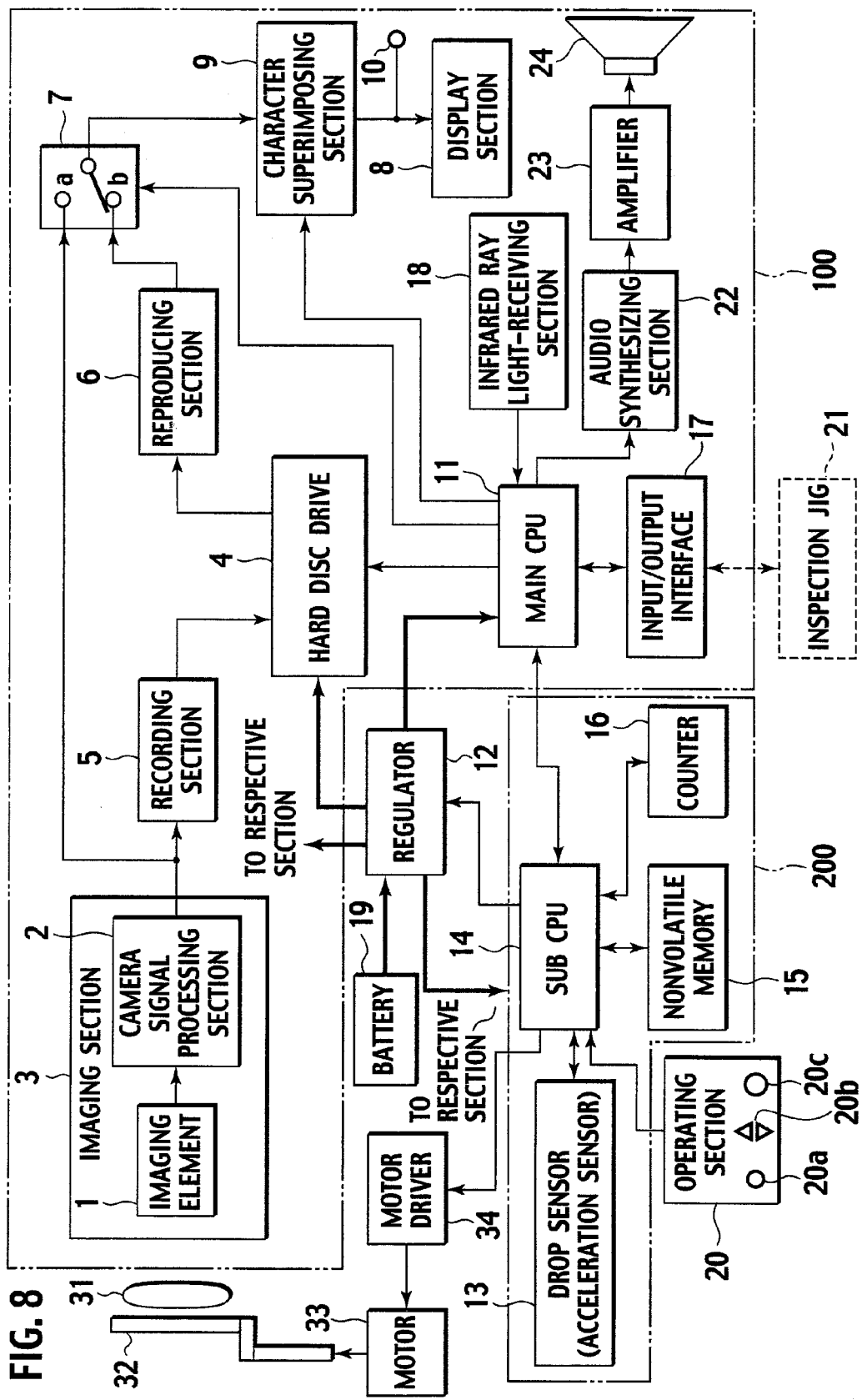
FIG. 8 is a block diagram illustrating a second embodiment of the present invention.

FIG. 8 is a block diagram illustrating the recording/reproducing device according to a second embodiment of the present invention. In the second embodiment of the present invention, the recording/reproducing device having an imaging lens is constituted so that a damage of the imaging lens is prevented when the device is dropped. Also in the second embodiment, a camcorder is an example of the recording/reproducing device. The present invention is not limited to the camcorder, and can be applied also to still cameras (digital cameras) that photograph a still image and records/reproduces the still image. In the second embodiment shown in FIG. 8, the constitution that prevents the damage of the imaging lens is added to the constitution of the first embodiment shown in FIG. 1. In FIG. 8, the same reference numerals are assigned to the same portions in the second embodiment as the portions in the first embodiment and explanation of common portions will be omitted herein.

In FIG. 8, a lens cover 32 is provided to a front surface of the imaging lens 31 (the object side). In FIG. 8, the lens cover 32 is in a close state, namely, the lens cover 32 covers the imaging lens 31. In the state that the power of the main section 100 is turned on and photographing and recording are enabled, the lens cover 32 is automatically brought into the open state as mentioned later. In the state that the lens cover 32 is opened, a light signal from the object is condensed by the imaging lens 31 so as to be input into the imaging element 1 of the imaging section 3.

Figure 9:
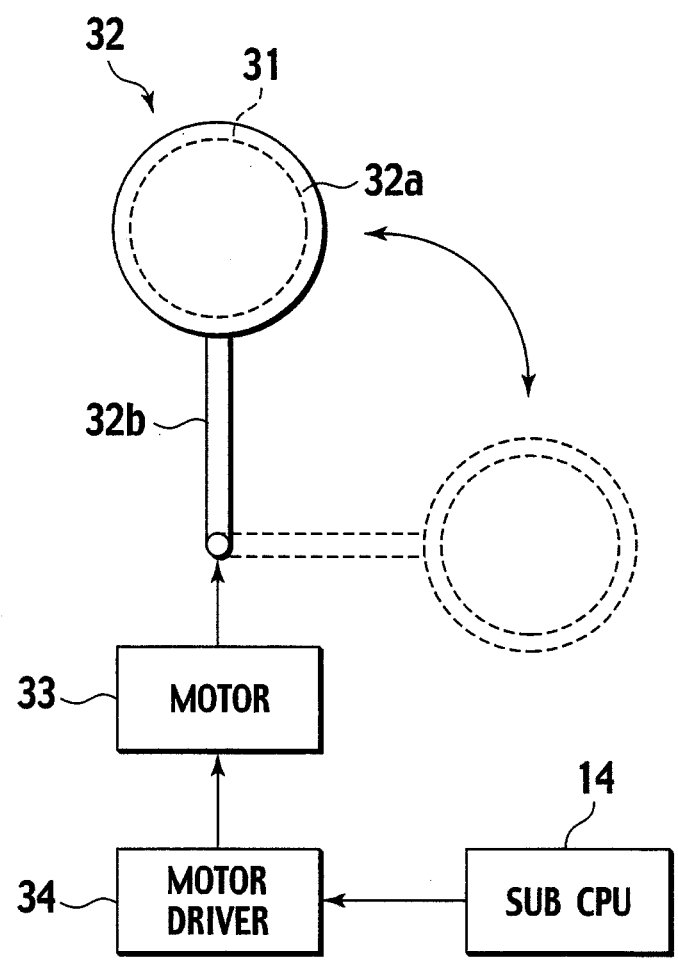
FIG. 9 is a diagram illustrating a portion in detail according to the second embodiment.

FIG. 9 is a diagram illustrating a portion of the second embodiment in detail. As shown in FIG. 9, the lens cover 32 has a disc portion 32a for covering the imaging lens 31, and an arm portion 32b which is connected to the disc portion 32a. The arm portion 32b is connected to a motor 33 which can rotate in normal and reverse directions. The lens cover 32 is brought into in any one of the close state for covering the imaging lens 31 shown by a solid line and the open state shown by a broken line where the lens cover 32 turns about 90° with respect to the close state so as to uncover the imaging lens 31 by driving the motor 33 in the normal or reverse direction.

In FIGS. 8 and 9, similarly to the first embodiment, when the sub CPU 14 detects that the device is in the drop state and the device has dropped for a predetermined distance based on the detected output from the drop sensor 13, the sub CPU 14 instructs a motor driver 34 to actuate the motor 33 and close the lens cover 32 which has been in the open state. The motor driver 34, which receives the instruction for closing the lens cover 32, drives the motor 33 so as to bring the lens cover 32 into the close state. The motor 33 and the motor driver 34 are a driving section that drives the lens cover 32.

FIGS. 10 and 11 are flowcharts for explaining the operation according to the second embodiment.

With reference to FIG. 10, the cooperation between the turning-on/disconnecting of the electric supply to the device by means of the power supply button 20c and the open/close operation of the lens cover 32 will be explained below with reference to FIG. 10. In FIG. 10, the sub CPU 14 determines whether the power supply button 20c is pressed down at step S201. When the determination is made that the power supply button 20c is pressed down (Yes), the sub CPU 14 instructs the motor driver 34 to open the lens cover 32 which has been in the close state. The sub CPU 14 controls the regulator 12 at step S203 so that the power supply of the device is turned on. When the determination is made that the power supply button 20c is not pressed down at step S201 (No)), the sequence returns to step S101. In the second embodiment, the lens cover 32 is brought into the open state in cooperation with the instruction for turning on the power supply of the device from the user. The order of the steps S202 and S203 may be reversed.

After the power supply of the device is turned on and the device is brought into the operating state, the sub CPU 14 determines whether the power supply button 20c is pressed down at step S204. When the sub CPU 14 determines that the power supply button 20c is pressed down (Yes) controls the regulator 12 so that the power supply of the device is disconnected at step S205. The sub CPU 14 instructs the motor driver 34 to close the lens cover 32 which has been in the open state and ends the process at step S206. When the sub CPU 14 determines that the power supply button 20c is not pressed at step S204 (No), the sequence returns to step S204. In the second embodiment, the lens cover 32 is brought into the close state in cooperation with the instruction for cutting the power supply of the device from the user. The order of the steps S205 and S206 may be reversed.

The process of bringing the lens cover 32 into the close state in cooperation with the detection of the device drop will be explained below with reference to FIG. 11. As mentioned before, in the second embodiment shown in FIG. 8, the constitution that prevents the damage of the imaging lens is added to the constitution of the first embodiment shown in FIG. 1. For this reason, the process of disconnecting the power supply of the device is also executed in cooperation with the detection of the device drop explained with reference to FIG. 3, but only the process of preventing the damage of the imaging lens with the lens cover 32 being in the close state is illustrated and is explained.

In FIG. 11, the sub CPU 14 determines whether the device is in the drop state based on the detected output from the drop sensor 13 at step S301. When the detected output from the drop sensor 13 is not more than a predetermined threshold value which is approximately zero, the sub CPU 14 determines that the device is in the drop state. When the determination is made that the device is not in the drop state (No), the sequence returns to step S301. When the determination is made that the device is in the drop state at step S301 (Yes)) the sub CPU 14 allows the counter 16 to count the time from the starting of the drop state at step S302, so as to start the measurement of the drop time. Thereafter, the sub CPU 14 determines whether the drop of the device stopped within the time corresponding to a predetermined distance, for example, 20 cm based on the value counted by the counter 16 at step S303. When the sub CPU 14 determines that the drop of the device stopped within the time corresponding to 20 cm at step S303 (Yes), the process is ended. When the sub CPU 14 determines that the drop of the device did not stop within the time corresponding to 20 cm at step S303 (No), the sequence goes to step S304.

The sub CPU 14 determines whether the device dropped for the time corresponding to 20 cm based on the value counted by the counter 16 at step S304. When the sub CPU 14 determines that the device has not yet dropped for the time corresponding to 20 cm at step 9304 (No), the sequence returns to step S304. When the sub CPU 14 determines that the device has dropped for the time corresponding to 20 cm (Yes), the sequence goes to step S305. As to the function of bringing the lens cover 32 into the close state in cooperation with the drop of the device (lens cover automatic close control function), "effective" or "ineffective" can be selected by selecting on a menu. The sub CPU 14 determines whether the lens cover automatic close control function is effective at step S305. When the sub CPU 14 determines that the function is effective (Yes)), it instructs the motor driver 34 to close the lens cover 32 and end the process. When the sub CPU 14 determines that the function is not effective (No), it ends directly the process.

It should be understood that many modifications and adaptations of the invention will become apparent to those skilled in the art and it is intended to encompass such obvious modifications and changes in the scope of the claims appended hereto.

What is claimed is:

1. A recording/reproducing device that records or reproduces information, comprising:
a recording/reproducing section that records or reproduces the information;
a file creating section that creates a file with a predetermined format where an actual data file containing video data is pared with a management information file as management information of the actual data file;
a file recording management section that is provided with a first folder for storing the file with the predetermined format and a second folder for storing another file as folders to be used for recording the information in the recording/reproducing section, and manages files to store the file with the predetermined format in the first folder when the file with predetermined format is recorded in the recording/reproducing section;

a power supply that supplies an electric power to the recording/reproducing section, the file creating section and the file recording management section so as to bring the recording/reproducing device into an operating state; and an operating section that gives instructions for turning on and disconnecting the power supply, wherein in a case where the power supply is turned on by the operating section after disconnecting the power supply so that the recording/reproducing device is brought into the operating state, when the management information file to be pared with the actual data file created before disconnecting the electric power is not normally created, the file recording management section manages the recording of the file so that the actual data file is stored in the second folder.

2. The recording/reproducing device according to claim 1, wherein when the management information file to be pared with the actual data file created before disconnecting the electric power is not normally created, the file recording management section manages the recording of the file so that the actual data file is stored in the second folder, by an instruction for restoring the file from a user.

3. The recording/reproducing device according to claim 1, wherein the actual data file is an MOD file based on an SD-Video specifications, and the management information file is an MOI file based on the SD-Video specifications.

* * * * *